United States Patent
Chang et al.

(10) Patent No.: US 11,653,328 B2
(45) Date of Patent: May 16, 2023

(54) USER EQUIPMENT AND METHOD EXECUTED THEREBY, BASE STATION AND METHOD EXECUTED THEREBY, AND MOBILE CONTROL ENTITY AND METHOD EXECUTED 1HEREBY

(71) Applicants: SHARP KABUSHIKI KAISHA, Sakai (JP); FG Innovation Company Limited, Tuen Mun (HK)

(72) Inventors: Ningjuan Chang, Shanghai (CN); Chao Luo, Shanghai (CN); Renmao Liu, Shanghai (CN)

(73) Assignees: SHARP KABUSHIKI KAISHA, Osaka (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 17/278,821

(22) PCT Filed: Sep. 25, 2019

(86) PCT No.: PCT/CN2019/107801
§ 371 (c)(1),
(2) Date: Mar. 23, 2021

(87) PCT Pub. No.: WO2020/063666
PCT Pub. Date: Apr. 2, 2020

(65) Prior Publication Data
US 2022/0039060 A1 Feb. 3, 2022

(30) Foreign Application Priority Data
Sep. 26, 2018 (CN) .......................... 201811127800.4

(51) Int. Cl.
*H04W 68/00* (2009.01)
*H04W 76/19* (2018.01)
(Continued)

(52) U.S. Cl.
CPC ......... *H04W 68/005* (2013.01); *H04W 12/03* (2021.01); *H04W 12/041* (2021.01); *H04W 28/06* (2013.01); *H04W 76/19* (2018.02)

(58) Field of Classification Search
None
See application file for complete search history.

(56) References Cited

U.S. PATENT DOCUMENTS

2016/0135220 A1 5/2016 Jha et al.
2018/0324869 A1* 11/2018 Phuyal .................. H04W 72/14
(Continued)

FOREIGN PATENT DOCUMENTS

| CN | 102223715 A | 10/2011 |
| CN | 103458386 A | 12/2013 |

(Continued)

OTHER PUBLICATIONS

Qualcomm Incorporated et al., "Introduction of EDT for eMTC and NB-IoT enhancements", R2-1813091, 3GPP TSG-RAN2 Meeting #103, Gothenburg, Sweden, Aug. 20, 2018-Aug. 24, 2018, paragraphs [5.3.1.4]-[5.3.3.1b], [6.7.3 6]-[11.2].

(Continued)

*Primary Examiner* — Otis L Thompson, Jr.
(74) *Attorney, Agent, or Firm* — ScienBiziP, P.C.

(57) ABSTRACT

The present invention provides a user equipment, a method executed by a user equipment, a base station, a method executed by a base station, a mobile control entity, and a method executed by a mobile control entity. The method executed by a user equipment comprises: receiving a paging message from a base station; and determining whether to perform a downlink early data transmission (EDT) preparation operation based on downlink EDT indication information when the user equipment UE initiates an RRC (Continued)

connection establishment procedure or an RRC connection resume procedure based on the paging message.

14 Claims, 3 Drawing Sheets

(51) Int. Cl.
*H04W 12/03* (2021.01)
*H04W 12/041* (2021.01)
*H04W 28/06* (2009.01)

(56) References Cited

U.S. PATENT DOCUMENTS

| | | | |
|---|---|---|---|
| 2019/0104553 A1* | 4/2019 | Johansson | H04W 74/0833 |
| 2019/0141515 A1* | 5/2019 | Kim | H04W 52/0229 |
| 2019/0223221 A1* | 7/2019 | Johansson | H04W 68/02 |
| 2019/0342800 A1* | 11/2019 | Sirotkin | H04W 80/02 |
| 2020/0015112 A1* | 1/2020 | Kim | H04W 48/04 |
| 2020/0053795 A1* | 2/2020 | Lin | H04W 76/27 |
| 2020/0100321 A1* | 3/2020 | Sengupta | H04L 5/10 |
| 2020/0187245 A1* | 6/2020 | Fujishiro | H04W 4/70 |
| 2020/0374927 A1* | 11/2020 | Yu | H04W 74/006 |
| 2021/0045083 A1* | 2/2021 | Liu | H04W 64/00 |
| 2021/0076306 A1* | 3/2021 | Tamura | H04W 48/02 |
| 2021/0127449 A1* | 4/2021 | da Silva | H04W 76/19 |
| 2021/0259013 A1* | 8/2021 | Wong | H04W 74/004 |
| 2021/0321360 A1* | 10/2021 | Wong | H04W 76/27 |

FOREIGN PATENT DOCUMENTS

| | | |
|---|---|---|
| CN | 104756593 A | 7/2015 |
| CN | 107466115 A | 12/2017 |
| EP | 3651503 A1 | 5/2020 |
| EP | 3806557 A1 | 4/2021 |
| EP | 3813482 A1 | 4/2021 |
| EP | 3834573 A1 | 6/2021 |
| WO | 2020030711 A1 | 2/2020 |

OTHER PUBLICATIONS

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 14)", V714.7.0 (Jun. 2018).

Huawei, HiSilicon, Neul, "New WID on Further NB-IoT enhancements", RP-170852, #3GPP TSG RAN Meeting #75 Dubrovnik, Croatia, Mar. 6-9, 2017.

Ericsson, Huawei, "New WID on Rel-16 enhancements for NB-IoT", RP-181451, 3GPP TSG RAN Meeting #80 La Jolla, USA, Jun. 11-14, 2018.

Ericsson, Qualcomm, "New WID on Even further enhanced MTC for LTE", RP-170732, 3GPP TSG RAN Meeting #75 Dubrovnik, Croatia, Mar. 6-9, 2017.

* cited by examiner

USER EQUIPMENT AND METHOD EXECUTED THEREBY, BASE STATION AND METHOD EXECUTED THEREBY, AND MOBILE CONTROL ENTITY AND METHOD EXECUTED 1HEREBY

FIELD

The present disclosure relates to the technical field of wireless communication, and more particularly, to a user equipment, a method executed by a user equipment, a base station, and a method executed by a base station.

BACKGROUND

In March 2017, a new work item regarding further enhancement of NarrowBand Internet of Things (NB-IoT) (see RP-170852: New WID on Further NB-IoT enhancements) and a new work item regarding further enhancement of Machine Type Communication (MTC) (see non-patent document: RP-170732: New WID on Even further enhanced MTC for LTE) were approved at the 3rd Generation Partnership Project (3GPP) RAN #75 plenary meeting. One of the objectives of these two research items is to enhance transmission for a small data packet service. A small amount of data (e.g., 1000 bits) needs to be transmitted within a period of time in the small data packet service and can be completed through one transport block of a physical layer, whereas data transmission in the existing mechanism must be completed only after a connection with an air interface for a Radio Resource Control (RRC) connected state is completed, resulting in that the signaling overhead required for transmitting small data packets becomes larger. In addition, a large amount of data of a user terminal in MTC or NB-IoT causes more severe signaling overhead. At the same time, the excessive signaling overhead also causes unnecessary energy consumption of the user terminal. In order to enable transmission of small data packets with less signaling overhead and achieve power saving of a user terminal (User Equipment, UE), it is proposed in small data transmission enhancement of Release 15 that a UE may not enter a radio resource control (RRC) connected state to perform data transmission. For example, small data may be transmitted together with a random access message 3 (Msg3) in a random access procedure. The small data transmission enhancement scheme of Release 15 enhances the uplink small data transmission mechanism, so that the UE may transmit data to the base station through the random access message 3 (Msg3) before the RRC connection is established, but the downlink small data transmission has not been discussed due to the limited time.

In June 2018, a new work item regarding further enhancement of NarrowBand Internet of Things (NB-IoT) (see RP-181451: New WID on R16 enhancement for NB-IoT) was approved at the 3rd Generation Partnership Project (3GPP) RAN #80 plenary meeting. One of the objectives of this research item is to implement mobile-terminated downlink early small data transmission in an NB-IoT network. The "mobile terminated" means that the terminal terminating a service transmission is a user terminal, that is, a network-originated downlink service transmission is different from a mobile-originated uplink service transmission.

The present disclosure mainly provides a method for implementing mobile-terminated downlink early small data transmission.

SUMMARY

In order to solve the above problem, the present disclosure provides a user equipment, a method executed by a user equipment, a base station, and a method executed by a base station.

According to a first aspect of the present invention, a method executed by a user equipment UE is provided and comprises: receiving a paging message from a base station; and determining whether to perform a downlink early data transmission (EDT) preparation operation based on downlink EDT indication information when the UE initiates an RRC connection establishment procedure or an RRC connection resume procedure based on the paging message.

In the method described above, the downlink EDT indication information may be included in system information or the paging message.

In the method described above, the downlink EDT preparation operation is performed when the downlink EDT indication information exists, and the downlink EDT preparation operation is not performed when the downlink EDT indication information does not exist; or the downlink EDT preparation operation is performed when a value of the downlink EDT indication information is 1 or TRUE, and the downlink EDT preparation operation is not performed when the value of the downlink EDT indication information is 0 or FALSE.

In the method described above, the downlink EDT indication information includes enhanced coverage level information, and the UE determines whether to perform the downlink EDT preparation operation based on the enhanced coverage level information.

In the method described above, the downlink EDT indication information is a downlink EDT UE identity list included in the paging message, and when a UE identity of the UE is included in the downlink EDT UE identity list, the UE performs the downlink EDT preparation operation.

In the method described above, the downlink EDT indication information is an integer represented by M bits and corresponds to a corresponding entry in a UE identity list included in the paging message.

In the method described above, the downlink EDT preparation operation comprises at least one of the following operations: restoring a PDCP state corresponding to a DRB and/or a SRB; re-establishing a PDCP entity for the DRB and/or the SRB; if a drb-continueROHC indication is provided in a most recent previous RRC connection release message and if the UE resumes or establishes an RRC connection within a same cell, then indicating to a lower layer that a stored UE access stratum context is used and drb-continueROHC is configured and continuing a header compression protocol context for the DRB configured with the header compression protocol; if the drb-continueROHC indication is not provided in the most recent previous RRC connection release message, or if the UE resumes or establishes the RRC connection within a different cell, then indicating to the lower layer that the stored UE access stratum context is used and resetting the header compression protocol context for the DRB configured with the header compression protocol; resuming a DRB and/or a SRB; using a stored NCC value and deriving a $K_{eNB}$ key based on a $K_{ASME}$ key associated with a current $K_{eNB}$ key; deriving a KRRCint key associated with a previously configured integrity algorithm; deriving a KRRCenc key and a KUPenc key associated with a previously configured encryption algorithm; configuring the lower layer to use the previously configured integrity algorithm and the derived KRRCint key to resume integrity protection for a subsequent message received and transmitted by the UE; configuring the lower layer to use the previously configured encryption algorithm and the derived KRRCenc key to resume encryption/decryption for the subsequent message received and transmitted by the UE; configuring the lower layer to use the previously configured encryption algorithm and the derived KUPenc key to immediately resume encryption/decryption for user data received or transmitted by the UE; resuming security; and configuring the lower layer to use EDT.

According to a second aspect of the present invention, a user equipment is provided and comprises: a processor; and a memory configured to store instructions; wherein the instructions, when executed by the processor, may perform the method described in this disclosure.

According to a third aspect of the present invention, a method performed by a base station is provided and comprises: transmitting a paging message to a user equipment UE; and indicating to the UE through downlink early data transmission (EDT) indication information whether to perform a downlink EDT preparation operation when an RRC connection establishment procedure or an RRC connection resume procedure is initiated based on the paging message.

According to a fourth aspect of the present invention, a base station is provided and comprises: a processor; and a memory configured to store instructions; wherein the instructions, when executed by the processor, may perform the method described in this disclosure.

BRIEF DESCRIPTION OF THE DRAWINGS

The above and other features of the present disclosure will become more apparent with the following detailed description in conjunction with the accompanying drawings.

DETAILED DESCRIPTION OF THE PREFERRED EMBODIMENTS

According to the following detailed description of exemplary embodiments of the present disclosure made in conjunction with the accompanying drawings, other aspects, advantages, and prominent features of the present disclosure will become apparent to those skilled in the art.

In the present disclosure, the terms "comprise" and "include" and derivatives thereof mean inclusion without limitation; the term "or" may have an inclusive meaning and means "and/or."

In the present specification, the following various embodiments for describing the principles of the present disclosure are merely illustrative, and should not be interpreted in any way as limiting the scope of the disclosure. The following description with reference to the accompanying drawings is intended to facilitate a comprehensive understanding of exemplary embodiments of the present disclosure as defined by the claims and equivalents thereof. The following description includes a variety of specific details to facilitate understanding, but these details should be considered merely exemplary. Therefore, those ordinary skill in the art should recognize that various changes and modifications may be made to the embodiments described herein without departing from the scope and spirit of the present disclosure. Besides, the description of the known function and structure is omitted for clarity and simplicity. In addition, the same reference numerals are used for similar functions and operations throughout the figures.

A plurality of embodiments according to the present disclosure are specifically described below by adopting an LTE mobile communication system and its subsequent evolved versions as an exemplary application environment. However, it should be noted that the present disclosure is not limited to the following embodiments, but may be applied to more other wireless communication systems, such as an NB-IoT system or an MTC system, and may also be applied to a next-generation 5G wireless communication system (New Radio, NR).

The base station in the present disclosure may be any type of base station including a Node B, an enhanced base station eNB, a base station gNB in a 5G communication system, a micro base station, a picocell base station, a macro base station, or a home base station; and the cell may also be a cell covered by any type of base station described above. A UE may by an NB-IoT UE, a BL (Bandwidth reduced Low complexity) UE, or a UE in an enhanced coverage, or may be other UE such as a 5G NR UE. In that follow embodiments of the present disclosure, "indicate/indication" and "notify/notification" or "inform/information" may be interchange, and "enhanced coverage" and "coverage enhancement" may be interchanged.

Different embodiments may also be combined to operate.

Some concepts involved in the present disclosure are described below first. It should be noted that some names in the following description are merely exemplary and illustrative and not limiting, and other names may be used.

Enhanced coverage level: in the enhanced coverage technology, the degree of coverage required to be enhanced is categorized into a plurality of enhanced coverage levels. For example, in NB-IoT, the enhanced coverage level may range from level 0 to level 2. In some enhanced coverage methods, each enhanced coverage level may correspond to a different set of wireless parameter configurations, such as random access configurations (e.g., PRACH (Physical Random Access Channel) resources), or such as more repetitions are configured for higher enhanced coverage levels.

Paging: a paging message is used for notifying the UE, which is in an RRC idle state or an RRC inactive state, that downlink data will arrive, or notifying the UE of the update of system information. When it is used for the former, the paging message may include a UE identity list; as shown in the following code (only a content relevant to the paging message of the present disclosure is shown below, and irrelevant parts of the paging message are omitted), if the identity of the UE receiving the paging message is included in the paging message, then the UE may recognize that the UE has been paged and will receive downlink data transmission. Subsequently, in response to the received paging message, the UE may initiate an RRC connection establishment procedure or an RRC connection resume procedure to establish a connection with a network side so as to complete a downlink transmission.

```
Paging-NB                           ::=    SEQUENCE      {    pagingRecordList-r13
PagingRecordList-NB-r13                    OPTIONAL,
    PagingRecordList-NB-r13                    ::= SEQUENCE (SIZE (1..maxPageRec)) OF
PagingRecord-NB-r13
    PagingRecord-NB-r13 ::= SEQUENCE {
                                               ue-Identity-r13
                                               PagingUE-Identity, ... }
```

Random Access Response (RAR): it is a second message in a random access procedure. After receiving a random access preamble of the UE, a base station may transmit a random access response message in response to the reception of the random access preamble. The random access response message includes a timing advance field, an uplink grant field, a UE identity field, and so on.

Message 3 (Msg3): it is a third message in a random access procedure. In the present disclosure, the Msg3 collectively refers to uplink transmission transmitted by the UE on an uplink resource indicated by an uplink grant that is included in an RAR. In an RRC connection establishment procedure, a corresponding RRC message in Msg3 is an RRC connection establishment request message, and in an RRC connection resume procedure, a corresponding RRC message in Msg3 is an RRC connection resume request message. In the present disclosure, for convenience of description, in addition to the RRC message, sometimes the Msg3 also includes higher layer data transmitted together therewith.

Message 4 (Msg4): it is a downlink message used for responding to the Msg3 in a random access procedure and transmitted to the UE from a base station. The Msg4 may include a random access contention resolution identity used by the UE to perform random access contention resolution and to determine whether the current random access is successful, and may also include a downlink RRC message used for responding to an RRC message in the Msg3. For example, when the RRC message in the Msg3 is an RRC early data request message, the RRC message in the Msg4 may be an RRC early data complete message; when the RRC message in the Msg3 is an RRC connection establishment request message, the RRC message in the Msg4 may be an RRC connection establishment message or an RRC connection reject message; and when the RRC message in the Msg3 is an RRC connection resume request message, the RRC message in the Msg4 may be an RRC connection resume message, an RRC connection reject message or an RRC connection release message. In the present disclosure, for convenience of description, the Msg4 may also include user plane data (carried on a DRB (Data Radio Bearer)) transmitted together therewith or may include a MAC (Medium Access Control) layer data packet.

User Plane Optimization Solution and Control Plane Optimization Solution:

Communication systems before R15 already support two optimized data transmission solutions to reduce signaling overhead for data transmission and power consumption of UE, which are referred to as control plane cellular evolved packet service optimization (cp-CIoT-EPS-Optimisation) and user plane cellular evolved packet service optimization (up-CIoT-EPS-Optimisation). In the control plane cellular evolved packet service optimization solution, data on an application layer functioning as a non-access stratum (NAS) data packet is included in a signaling radio bearer (SRB) of a control plane for transmission and may be referred to as a control plane optimization solution or a control plane solution for short. In the user plane cellular evolved packet service optimization solution, still like data transmission in a conventional system, data on the application layer is transmitted on a data radio bearer ((user) DRB) in an RRC connected state, except that after the data transmission is completed, the UE and an eNB suspend an RRC connection (indicated by an RRC connection release message including a suspend indication), store a UE context, and enter an RRC idle state. When the UE needs to perform data transmission, the UE initiates an RRC connection resume procedure to the eNB (in this procedure, the UE transmits an RRC connection resume request message to the base station to initiate connection resumption, the base station transmits an RRC connection resume message to the UE to instruct the UE to resume the RRC connection, and then the UE feeds back an RRC connection resume complete message to the base station to make a response). Since the UE and the eNB store the UE context, the RRC connection, SRB, DRB and security can be resumed through the procedure without re-establishing the RRC connection, DRB and security. This solution may also be referred to as a user plane optimization solution or a user plane solution for short. The RRC idle state in which the UE stores the UE context, despite being called an RRC idle state, can be actually considered as an intermediate state between an RRC idle state and a connected state. This intermediate state can be considered as an RRC inactive state (RRC inactive) as defined in a 5G NR system.

In the user plane solution of Release 14, the UE initiating an RRC connection resume procedure may wait to receive an RRC connection resume message (Msg4) after transmitting an RRC connection resume request message (Msg3). If an integrity check for the RRC connection resume message fails, the UE may perform operations for leaving an RRC connected state (refer to Section 5.3.12 of the 3GPP Technical Specification 36.331 regarding the operations performed by the UE for leaving the RRC connected state), that is, the UE may consider that it may be attacked in a security aspect and thus terminate the RRC connection resume procedure and directly enter an RRC idle state. If the integrity check for the RRC connection resume message succeeds, the UE may continue to execute contents in the RRC connection resume message and enters an RRC connected state.

Early Data Transmission (EDT) in R15:

A small data transmission optimization solution in R15 optimizes small data transmission based on the two abovementioned optimization solutions. Uplink early small data transmission refers to transmission of small data together with the Msg3 in a random access procedure. Since this optimization mode can complete data transmission at an earlier time compared with the traditional data transmission mode, it is called early data transmission. In the present disclosure, small data (or small packet) may be equivalent to early data. For uplink early data transmission of R15, a UE indicates to a base station that it will perform EDT transmission by using an EDT-specific PRACH transmission resource or a random access preamble in a random access procedure.

For uplink EDT based on the control plane solution, user plane data functioning as a NAS PDU is included in an RRC message of the Msg3 and transmitted through an SRB. For uplink EDT based on the user plane solution, user plane data and an RRC message (Msg3) are multiplexed and assembled on a MAC layer to form the same MAC PDU (Protocol Data Unit) for transmission. The user data is transmitted through a DRB, and the RRC message is transmitted through an SRB, so that when triggering the EDT procedure, the UE should resume (or (re)activate) the DRB and security and apply a radio configuration used before RRC suspension to various protocol layers. The UE may resume the security in the RRC procedure based on new security keys (including an encryption key and an integrity key) derived by an NCC obtained in a previous RRC connection procedure, and further, the NCC is obtained from an RRC connection release message used for releasing an RRC connection of the UE in the previous RRC connection procedure to make the UE enter an idle state, in which the RRC connection is suspended, or enter an RRC inactive state. This solution is different from a conventional non-EDT transmission in which the DRB/SRB and security are only resumed based on an NCC configured in an RRC message after the Msg4 is received.

In the above uplink EDT, since the uplink EDT is initiated by the UE, the UE may perform a preparation work required for the EDT in advance when the EDT is initiated. For example, in the user plane solution, the UE may resume the security, SRB and DRB when the UE initiates an RRC procedure for the EDT. In a downlink EDT, in order to correctly perform the downlink EDT, the UE may also need to perform a preparation work required for the EDT in advance. However, the so-called mobile terminated downlink EDT is initiated by a base station, and the UE cannot know when the base station will initiate the downlink EDT in the current protocol, that is, for a mobile terminated downlink transmission, the UE cannot determine whether the base station will use an EDT and thus cannot determine when to perform a preparation work for the downlink EDT. One possible solution is that in a mobile terminated downlink transmission, the UE with EDT function may always prepare a preparation work for the downlink EDT in advance after receiving a paging message regardless of whether a downlink EDT scheme is used for the transmission. However, in this solution, when a cell in which the UE resides is a base station of Release 15, i.e., a base station that does not support the downlink EDT, the security resume mechanisms for an EDT transmission and a non-EDT transmission as mentioned above are different. In such a scenario, the UE uses a security resume mechanism for the EDT transmission while the base station of Release 15 uses a security resume mechanism for the non-EDT transmission, resulting in that the security resume states of the UE and the base station are asynchronous, and that the keys for encryption and integrity check are inconsistent, thus causing the security check to fail and causing the UE to enter an idle state. Therefore, the present disclosure mainly provides a solution on how a UE determines whether a base station will use an EDT when the UE receives a paging message.

Figure 1:
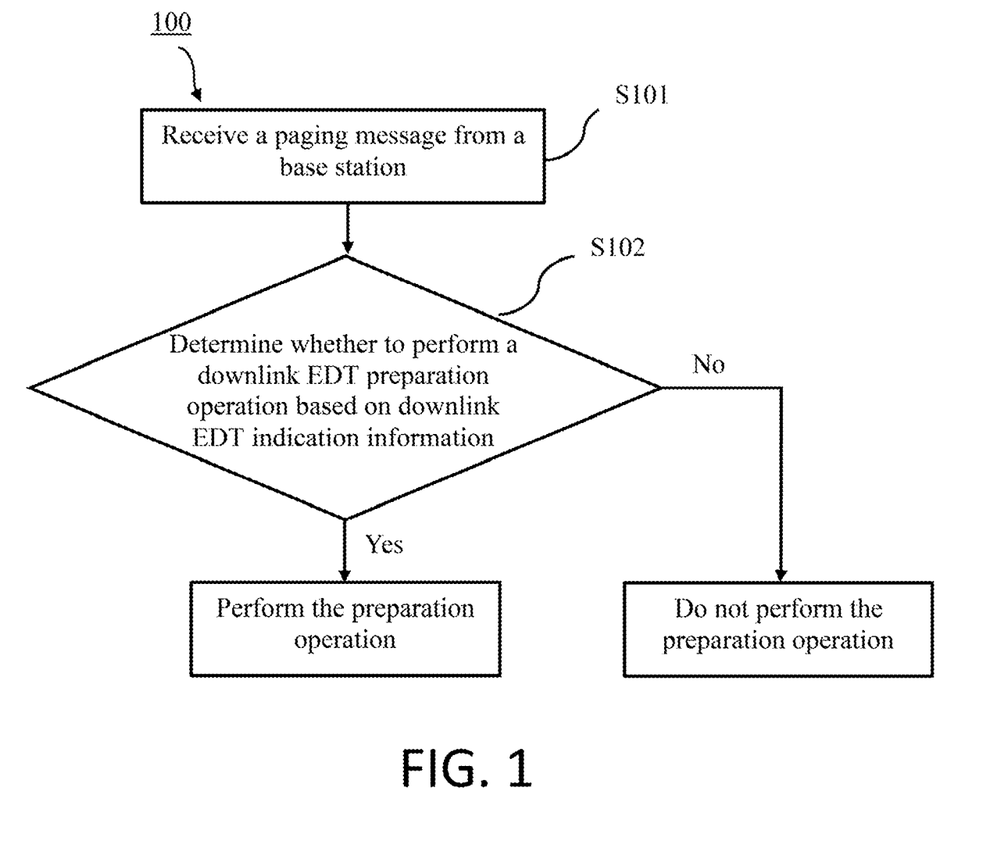
FIG. 1 shows a flowchart of a method 100 executed by a user equipment UE according to an embodiment of the present disclosure.

Hereinafter, a method executed by a user equipment UE of the present disclosure will be described as an example. FIG. 1 shows a flowchart of a method 100 executed by a user equipment according to an embodiment of the present disclosure.

In step S101, the user equipment UE receives a paging message from a base station. The paging message is used for informing the user equipment UE staying in an RRC idle state or inactive state that a downlink service transmission is available in a mobile terminated service transmission.

In step S102, the user equipment UE determines whether to perform a downlink early data transmission (EDT) preparation operation based on downlink EDT indication information when the user equipment UE initiates an RRC connection establishment procedure or an RRC connection resume procedure based on the received paging message.

Specifically, the user equipment UE receiving the paging message initiates an RRC connection establishment procedure or an RRC connection resume procedure if a UE identity of the user equipment UE is included in the paging message.

The downlink EDT indication information described above may be included in system information or paging message transmitted by the base station.

Further, as to how to determine whether to perform the downlink EDT preparation operation, the downlink EDT preparation operation may be performed when the downlink EDT indication information exists; and the downlink EDT preparation operation may not be performed when the downlink EDT indication information does not exist. Further, the downlink EDT preparation operation may be performed when a value of the downlink EDT indication information is 1 or TURE, and the downlink EDT preparation operation may not be performed when the value of the downlink EDT indication information is 0 or FALSE. Further, regarding the concrete operation details of the downlink EDT preparation operation, a preparation work in the embodiment 1 will be described below as an example.

In addition, the downlink EDT indication information may include enhanced coverage level information, and the user equipment UE may determine whether to perform a downlink EDT preparation operation based on enhanced coverage level information. Specifically, for example, if a downlink EDT indication information transmitted by the base station exists and an enhanced coverage level of the user equipment UE is less than or equal to a value configured in the downlink EDT indication information, then the user equipment UE may perform the downlink EDT preparation operation when the user equipment UE initiates an RRC connection establishment procedure or an RRC connection resume procedure. On the other hand, if a downlink EDT indication information transmitted by the base station is not received, or if an enhanced coverage level of the user equipment UE is greater than or equal to a value configured in the downlink EDT indication information, then the user equipment UE may not perform the downlink EDT preparation work when the user equipment UE initiates an RRC connection establishment procedure or an RRC connection resume procedure.

Figure 2:
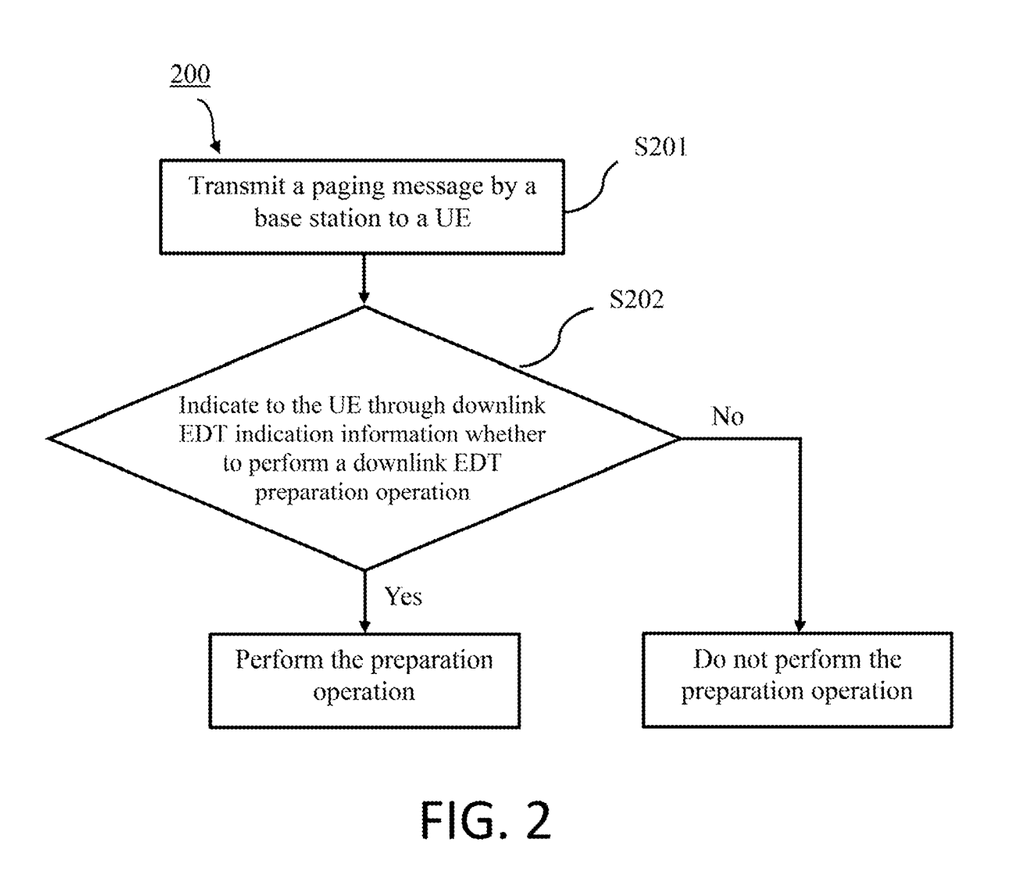
FIG. 2 shows a flowchart of a method 200 executed by a base station according to an embodiment of the present disclosure.

Besides, a method executed by a base station of the present disclosure will be described as an example. FIG. 2 shows a flowchart of a method 200 executed by a base station according to an embodiment of the present disclosure.

In step S201, the base station transmits a paging message to a user equipment UE. The paging message is used for informing the user equipment UE staying in an RRC idle state or inactive state that a downlink service transmission is available in a mobile terminated service transmission.

In step S202, the base station indicates to the user equipment UE through downlink EDT indication information whether to perform a downlink EDT preparation operation when an RRC connection establishment procedure or an RRC connection resume procedure is initiated based on the paging message.

Figure 3:
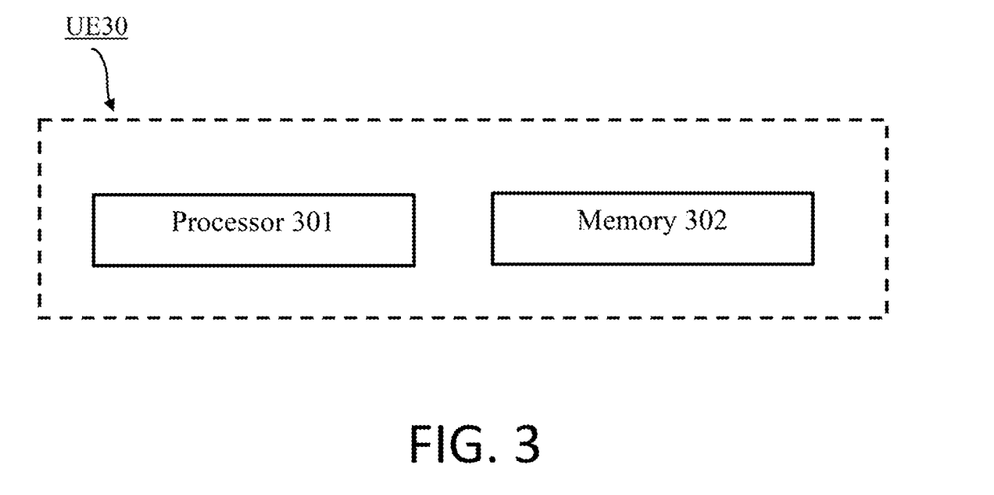
FIG. 3 shows a block diagram of a user equipment 30 according to an embodiment of the present disclosure.

Besides, FIG. 3 shows a block diagram of a user equipment 30 according to an embodiment of the present disclosure. As shown in FIG. 3, the user equipment 30 includes a processor 301 and a memory 302. The processor 301 may include, for example, a microprocessor, a microcontroller, an embedded processor, or the like. The memory 302 may include, for example, a volatile memory (e.g., random access memory; RAM), a hard disk drive (HDD), a non-volatile memory (e.g., flash memory), or other memory system. The memory 302 has program instructions stored thereon. The instructions, when executed by the processor 301, may perform the methods executed by the user equipment, which have been described above in detailed according to the present disclosure.

Figure 4:
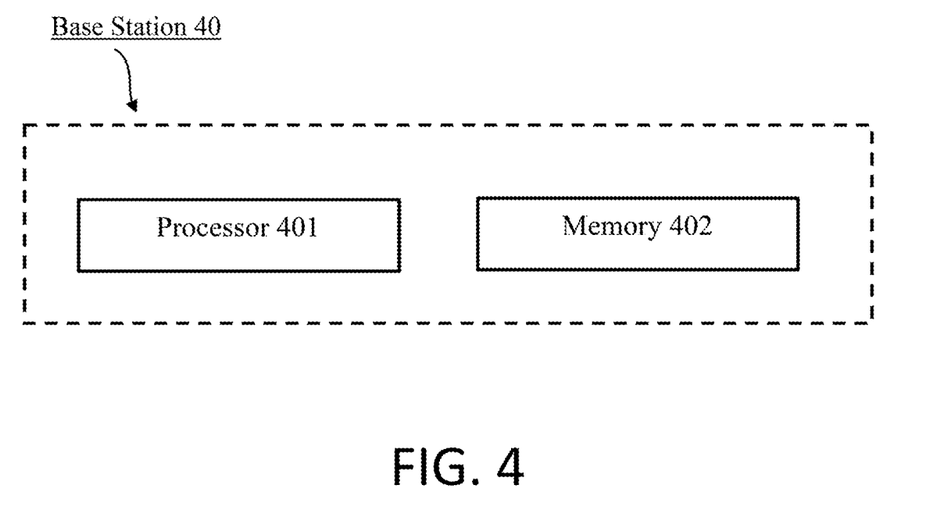
FIG. 4 shows a block diagram of a base station 40 according to an embodiment of the present disclosure.

In addition, FIG. 4 shows a block diagram of a base station 40 according to an embodiment of the present disclosure. As shown in FIG. 4, the base station 40 includes a processor 401 and a memory 402. As described above, the base station 40 in the present disclosure may be any type of base station including, but not limited to, a Node B, an enhanced base station eNB, a base station gNB in a 5G communication system, a micro base station, a picocell base station, a macro base station, or a home base station. The processor 401 may include, for example, a microprocessor, a microcontroller, an embedded processor, or the like. The memory 402 may include, for example, a volatile memory (e.g., random access memory; RAM), a hard disk drive (HDD), a non-volatile memory (e.g., flash memory), or other memory system. The memory 402 has program instructions stored thereon. The instructions, when executed by the processor 401, may perform the methods executed by the base station, which have been described above in detailed according to the present disclosure.

Hereinafter, concrete embodiments of the present disclosure will be described. In addition, as described above, the embodiments in the present disclosure are exemplary illustrations for ease of understanding the present invention and are not intended to limit the present invention.

Embodiment 1

The embodiment 1 of the present invention will be described below. The embodiment 1 provides a method executed on a UE for the UE to determine whether to initiate a mobile terminated service transmission by using an EDT.

Step 1: The UE receives downlink EDT indication information from a base station. Preferably, the indication information is included in system information, such as system information block 1 or system information block 2. Preferably, the step further comprises that the UE stores the received downlink EDT indication information. Step 1 may be optional.

The downlink EDT indication information is used for indicating (whether) a cell supports or allows a downlink EDT. In other words, the downlink EDT indication information is used for indicating whether the UE is allowed for a downlink EDT. In one implementation, if the downlink EDT indication information exists, the UE may recognize that the cell supports or allows the downlink EDT; and if the downlink EDT indication information does not exist, the UE may recognize that the cell does not support or allow the downlink EDT. In another implementation, if the downlink EDT indication information is configured as 1 or TRUE, the UE may recognize that the cell supports or allows the downlink EDT; and if the downlink EDT indication information is configured as 0 or FALSE, the UE may recognize that the cell does not support or allow the downlink EDT.

Step 2: The UE receives a paging message from the base station. The paging message is used for informing the UE staying in an RRC idle state or inactive state that a downlink service transmission is available in a mobile terminated service transmission.

Step 3: The UE receiving the paging message initiates an RRC connection establishment procedure or an RRC connection resume procedure to establish a connection with a network side if a UE identity (such as an International Mobile Subscriber Identity (IMSI), a System Architecture Evolution Temporary Mobile Station Identifier (S-TMSI), or an Inactive Radio Network Temporary Identifier (I-RNTI)) of the UE is included in the paging message. Preferably, an establishment cause for initiating the RRC connection establishment procedure or RRC connection resume procedure is mt-access. If the downlink EDT indication information transmitted by the base station in Step 1 exists, or if a value of the downlink EDT indication information is configured as 1 or TRUE, the UE performs a downlink EDT preparation work when the UE initiates an RRC connection establishment procedure or an RRC connection resume procedure. Optionally, otherwise, if a downlink EDT indication information transmitted by the base station is not received in Step 1, or if a value of the downlink EDT indication information received is configured as 0 or FALSE, the UE does not perform the downlink EDT preparation work when the UE initiates the RRC connection establishment procedure or the RRC connection resume procedure. If it is in a user plane solution (that is, if the UE is initiating a user plane EDT (UP-EDT)), the performed downlink EDT preparation work comprises one or more of the following operations:

√ The UE restores a PDCP state corresponding to a DRB and/or an SRB; preferably, the UE restores PDCP states corresponding to all DRBs and all SRB.

√ The UE re-establishes a PDCP entity for a DRB and/or an SRB; preferably, the UE re-establishes PDCP entities for all DRBs and all SRBs.

√ If a drb-continueROHC indication is provided in a most recent previous RRC connection release message and if the UE resumes or establishes an RRC connection within a same cell, then the UE indicates to a lower layer that a stored UE access stratum context is used and that drb-continueROHC is configured, and continues a header compression protocol context for a DRB configured with the header compression protocol; else (if the drb-continueROHC indication is not provided in the most recent previous RRC connection release message, or if the UE resumes or establishes the RRC connection within a different cell), the UE indicates to the lower layer that the stored UE access stratum context is used, and resets the header compression protocol context for the DRB configured with the header compression protocol. Here, drb-continueROHC is used for indicating to continue the header compression protocol context for the DRB configured with the header compression protocol; and if drb-continueROHC is not configured, the header compression protocol context for the DRB configured with the header compression protocol is reset.

√ The UE resumes a DRB and/or an SRB. Preferably, the UE resumes all SRBs and DRBs.

√ The UE uses a stored NCC value and derives a $K_{eNB}$ key based on a $K_{ASME}$ key associated with a current $K_{eNB}$ key.

√ The UE derives a KRRCint key associated with a previously configured integrity algorithm.

√ The UE derives a KRRCenc key and a KUPenc key associated with a previously configured encryption algorithm.

√ The UE configures the lower layer to use the previously configured integrity algorithm and the derived KRRCint key to resume integrity protection for a subsequent message received and transmitted by the UE.

√ The UE configures the lower layer to use the previously configured encryption algorithm and the derived KRRCenc key to resume encryption/decryption for the subsequent message received and transmitted by the UE.

√ The UE configures the lower layer to use the previously configured encryption algorithm and the derived KUPenc key to immediately resume encryption/decryption for user data received or transmitted by the UE.

√ The UE resumes security.

√ The UE configures the lower layer to use EDT.

Embodiment 2

Hereinafter, the embodiment 2 of the present invention will be described. The difference between the embodiment 2 and the embodiment 1 is that the downlink EDT indication information further includes enhanced coverage level information. This embodiment is executed on a UE.

Step 1: The UE receives downlink EDT indication information from a base station. Preferably, the indication information is included in system information, such as system information block 1 or system information block 2. Preferably, the step further comprises that the UE stores the received downlink EDT indication information. Step 1 may be optional.

The downlink EDT indication information is used for indicating (whether) a cell supports or allows a downlink EDT. In other words, the downlink EDT indication information is used for indicating whether the UE is allowed for a downlink EDT. Still further, the downlink EDT indication information includes enhanced coverage level information for indicating that the cell supports or allows an enhanced coverage level of the downlink EDT. In one implementation, the downlink EDT indication information includes an integer N, wherein if an enhanced coverage level of the UE is greater than or equal to N, a downlink EDT is not supported or not allowed to be used; and if the enhanced coverage level of the UE is less than or equal to N, the downlink EDT is supported or allowed to be used.

Step 2: The UE receives a paging message from the base station. The paging message is used for informing the UE staying in an RRC idle state or inactive state that a downlink service transmission is available in a mobile terminated service transmission.

Step 3: The UE receiving the paging message initiates an RRC connection establishment procedure or an RRC connection resume procedure to establish a connection with a network side if a UE identity (such as an IMSI, an S-TMSI, or an I-RNTI) of the UE is included in the paging message. Preferably, an establishment cause for initiating the RRC connection establishment procedure or RRC connection resume procedure is mt-access. If the downlink EDT indication information transmitted by the base station in Step 1 exists, and if an enhanced coverage level of the UE is less than or equal to a value configured in the downlink EDT indication information, then the UE may perform a downlink EDT preparation work when the UE initiates an RRC connection establishment procedure or an RRC connection resume procedure. Optionally, otherwise, if the downlink EDT indication information transmitted by the base station is not received in Step 1, or if an enhanced coverage level of the UE is greater than or equal to a value configured in the downlink EDT indication information, then the UE may not perform a downlink EDT preparation work when the UE initiates the RRC connection establishment procedure or the RRC connection resume procedure. If it is in a user plane solution (that is, if the UE is initiating a user plane EDT (UP-EDT)), the performed downlink EDT preparation work is the same as that in the embodiment 1, and therefore, the description thereof is not repeated herein.

Embodiment 3

Hereinafter, the embodiment 3 of the present invention will be described. The difference between the embodiment 3 and the embodiment 1 is that the downlink EDT indication information is included in a paging message. This embodiment is executed on a UE.

Step 1: The UE receives a paging message including downlink EDT indication information from a base station. The paging message is used for informing the UE staying in an RRC idle state or inactive state that a downlink service transmission is available in a mobile terminated service transmission.

The downlink EDT indication information is used for indicating (whether) a downlink EDT is used for a current downlink service. In other words, the downlink EDT indication information is used for indicating whether the UE initiates a subsequent RRC connection establishment/resume procedure by using a downlink EDT. The downlink EDT is (or is not) used for the current downlink service may also be expressed as that the current paging is (or is not) transmitted for user data of the downlink EDT. Method for implementing the downlink EDT indication information is described in the following embodiments 4 to 5, but it should be noted that the embodiments 4 to 5 are only examples, and the present disclosure is not limited to the methods for implementing the downlink EDT indication information.

Step 2: If a UE identity (such as IMSI, S-TMSI, or I-RNTI) of the UE is included in the paging message, the UE receiving the paging message may initiate an RRC connection establishment procedure or an RRC connection resume procedure to establish a connection with a network side. Preferably, an establishment cause for initiating the RRC connection establishment procedure or RRC connection resume procedure is mt-access. When the UE initiates an RRC procedure, the UE may determine whether the downlink EDT is used for a current downlink transmission, i.e., whether to perform a downlink EDT preparation work, according to downlink EDT identity information in the received paging message. If a result of the determination is yes, the UE may perform the downlink EDT preparation work when the UE initiates the RRC connection establishment procedure or the RRC connection resume procedure. Optionally, if the result of the determination is no, the UE may not perform the downlink EDT preparation work when the UE initiates the RRC connection establishment procedure or the RRC connection resume procedure. If it is in a user plane solution (that is, if the UE is initiating a user plane EDT (UP-EDT)), the operations included by the performed downlink EDT preparation work are the same as those in the embodiment 1, and therefore, the description thereof is not repeated herein.

Embodiment 4

Hereinafter, the embodiment 4 of the present invention will be described. The embodiment 4 provides a method for the UE to determine whether a downlink EDT is used for a current transmission.

In this embodiment, if the downlink EDT indication information associated with the UE exists in a paging message or is configured as TRUE, the UE may recognize that the downlink EDT is used for a current downlink service; and if the downlink EDT indication information does not exist, the UE may recognize that the downlink EDT is not used for the current downlink service.

In this embodiment, the downlink EDT indication information (e.g., the following EDTindication-r16 information element) is included in a pagingrecord information element included in the paging message, and the pagingrecord information element includes a UE identity indicating that the paging message is associated with the UE corresponding to the UE identity.

```
PagingRecord-NB-r13 ::=SEQUENCE {
ue-Identity-r13 PagingUE-Identity,
EDTindication-r16          ENUMERATED {true}
...
}
```

In another implementation of the present embodiment, if the downlink EDT indication information is configured as 1, the UE may recognize that the downlink EDT is used for a current downlink service; and if the downlink EDT indication information is configured as 0, the UE may recognize that the downlink EDT is not used for the current downlink service.

```
PagingRecord-NB-r13 ::=SEQUENCE {
ue-Identity-r13 PagingUE-Identity,
EDTindication-r16          BOOLEN
...
}
```

Embodiment 5

Hereinafter, the embodiment 5 of the present invention will be described. The embodiment 5 provides a method for the UE to determine whether a downlink EDT is used for a current transmission.

In this embodiment, in addition to the existing UE identity list, a new UE identity list (such as pagingrecordlist-r16 information element) is introduced into the paging message, and the EDT is used for a downlink transmission, which is triggered by a current paging message, of the UE indicated by a UE identity of the new UE identity list. Specifically, if the UE identity is included in the new UE identity list in the paging message, the UE may recognize that the downlink EDT is used for a current downlink service; and if the UE identity is not included in the new UE identity list (that is, the UE identity is included in the conventional pagingrecondlist) in the paging message, the UE may recognize that the downlink EDT is not used for the current downlink service.

In this embodiment, the downlink EDT indication information (e.g., the following pagingrecordlist-r16 information element) is a new paging UE identity list in the paging message.

```
Paging-NB ::=SEQUENCE {
pagingRecordList-r13    PagingRecordList-NB-r13 OPTIONAL,
pagingRecordList-r16    PagingRecordList-NB-r16 OPTIONAL,
}
```

Embodiment 6

Hereinafter, the embodiment 6 of the present invention will be described. The embodiment 6 provides a method for the UE to determine whether a downlink EDT is used for a current transmission.

In this embodiment, in addition to the existing UE identity list, a downlink EDT indication information, which may be an integer represented by M bits, is introduced into the paging message, and a value of the downlink EDT indication information corresponds to a corresponding entry in the UE identity list. For example, if the value of the downlink EDT indication information is configured as N, it indicates that an EDT is adopted for a downlink transmission of UE(s) corresponding to the previous N (or the last N) UE identity entries in the UE identity list (i.e., pagingrecordlist).

If a UE identity of the UE is included in the UE identity list in the paging message, and if the value N of the downlink EDT indication information is configured and the UE identity is presented in the previous N (or the last N) UE identity entries in the UE identity list, then the UE receiving the paging message may recognize that the EDT is used for a subsequent downlink transmission. When the UE initiates a corresponding RRC connection establishment procedure or a corresponding RRC connection resume procedure, the UE may use the EDT, that is, the UE may perform a downlink EDT preparation operation. Optionally, otherwise, if a UE identity of the UE is included in the UE identity list in the paging message, and if the value N of the downlink EDT indication information is not configured or the UE identity is not presented in the previous N (or the last N) UE identity entries in the UE identity list, then the UE receiving the paging message may recognize that the EDT is not used for a subsequent downlink transmission. When the UE initiates a corresponding RRC connection establishment procedure or a corresponding RRC connection resume procedure, the UE may not use the EDT, that is, the UE may not perform a downlink EDT preparation operation.

In this embodiment, the downlink EDT indication information (e.g., the following EDTindication-r16 information element) is an integer included in the paging message.

```
Paging-NB ::= SEQUENCE {
    pagingRecordList-r13          PagingRecordList-N13-r13
OPTIONAL,
    PagingRecordList-NB-r13 ::= SEQUENCE (SIZE (1..maxPageRec))
OF PagingRecord-NB-r13
    EDTindication-NB-r16 ::= interger(1...16)
}
```

The embodiments based on the user equipment UE have been described above, that is, the embodiments 1 to 6 executed on the user equipment UE have been described. Next, embodiments based on a base station will be described below. The following embodiments are implemented on the base station and correspond to the embodiments 1 to 6 executed on the UE.

Embodiment 7

The embodiment 7 provides a method for initiating a mobile terminated service transmission by using an EDT.

Step 1: The base station transmits downlink EDT indication information to a UE. Preferably, the indication information is included in system information, such as system information block 1 or system information block 2. Step 1 may be optional.

The downlink EDT indication information is used for indicating (whether) a cell supports or allows a downlink EDT. In other words, the downlink EDT indication information is used for indicating whether the UE is allowed for a downlink EDT. In one implementation, if a cell supports or allows a downlink EDT, the base station configures that downlink EDT indication information exists; and if the cell does not support or allow the downlink EDT, the base station configures that the downlink EDT indication information does not exist. In another implementation, if a cell supports or allows a downlink EDT, the base station configures the downlink EDT indication information as 1 or TRUE; and if the cell does not support or allow the downlink EDT, the base station configures the downlink EDT indication information as 0 or FALSE.

Step 2: The base station transmits a paging message. The paging message is used for informing the UE staying in an RRC idle state or inactive state that a downlink service transmission is available in a mobile terminated service transmission.

Step 3: if the base station indicates that the cell supports or allows the downlink EDT in Step 1, the base station may recognize that the UE performs an EDT preparation operation in an RRC connection establishment procedure or an RRC connection resume procedure initiated in response to the paging message, and the base station may use an NCC stored in a UE access stratum context to derive a relevant security key and to activate security for transmitting an Msg4; and if the base station indicates that the cell does not support or does not allow the downlink EDT in Step 1, the base station may recognize that the UE does not perform the EDT preparation operation in the RRC connection establishment procedure or the RRC connection resume procedure initiated in response to the paging message, and the base station may allocate a new NCC in the Msg4 for the UE, derive a relevant security key based on the NCC, and activate security for transmitting an Msg4.

Embodiment 8

Hereinafter, the embodiment 8 of the present invention will be described. The difference between the embodiment 8 and the embodiment 7 is that the downlink EDT indication information further includes enhanced coverage level information.

Step 1: The base station transmits downlink EDT indication information to a UE. Preferably, the indication information is included in system information, such as system information block 1 or system information block 2. Step 1 may be optional.

The downlink EDT indication information is used for indicating (whether) a cell supports or allows a downlink EDT. In other words, the downlink EDT indication information is used for indicating whether the UE is allowed for a downlink EDT. In one implementation, if a cell supports or allows a downlink EDT, the base station configures that downlink EDT indication information exists; and if the cell does not support or allow the downlink EDT, the base station configures that the downlink EDT indication information does not exist. In another implementation, if a cell supports or allows a downlink EDT, the base station configures the downlink EDT indication information as 1 or TRUE; and if the cell does not support or allow the downlink EDT, the base station configures the downlink EDT indication information as 0 or FALSE.

The downlink EDT indication information is used for indicating (whether) a cell supports or allows a downlink EDT. In other words, the downlink EDT indication information is used for indicating whether the UE is allowed for a downlink EDT. Still further, the downlink EDT indication information includes enhanced coverage level information for indicating that the cell supports or allows an enhanced coverage level of the downlink EDT. In one implementation, the downlink EDT indication information includes an integer N, wherein if an enhanced coverage level of the UE is greater than or equal to N, a downlink EDT is not supported or not allowed to be used; and if the enhanced coverage level of the UE is less than or equal to N, the downlink EDT is supported or allowed to be used.

Step 2: The base station transmits a paging message to a UE. The paging message is used for informing the UE staying in an RRC idle state or inactive state that a downlink service transmission is available in a mobile terminated service transmission.

Step 3: if the downlink EDT indication information transmitted by the base station in Step 1 exists, and if an enhanced coverage level of the UE obtained by the base station is less than or equal to a value configured in the downlink EDT indication information, then the base station may recognize that the UE performs an EDT preparation operation in an RRC connection establishment procedure or an RRC connection resume procedure initiated in response to the paging message, and the base station may use an NCC stored in a UE access stratum context to derive a relevant security key and to activate security for transmitting an Msg4; and if the base station does not transmit the downlink EDT indication information in Step 1, or if an enhanced coverage level of the UE obtained by the base station is greater than or equal to a value configured in the downlink EDT indication information, then the base station may recognize that the UE does not perform the EDT preparation operation in the RRC connection establishment procedure or the RRC connection resume procedure initiated in response to the paging message, and the base station may allocate a new NCC in the Msg4 for the UE, derive a relevant security key based on the NCC, and activate security for transmitting an Msg4.

Embodiment 9

Hereinafter, the embodiment 9 of the present invention will be described below. The difference between the embodiment 9 and the embodiment 7 is that the downlink EDT indication information is included in a paging message. This embodiment is executed on a UE.

Step 1: The base station transmits a paging message including downlink EDT indication information to a UE. The paging message is used for informing the UE staying in an RRC idle state or inactive state that a downlink service transmission is available in a mobile terminated service transmission.

The downlink EDT indication information is used for indicating (whether) a downlink EDT is used for a current downlink service. In other words, the downlink EDT indication information is used for indicating whether the UE initiates a subsequent RRC connection establishment/resume procedure by using a downlink EDT. The downlink EDT is (or is not) used for the current downlink service may also be expressed as that the current paging is (or is not) transmitted for user data of the downlink EDT. Method for implementing the downlink EDT indication information is described in the following embodiments 10 to 12, but it should be noted that the embodiments 10 to 12 are only examples, and the present disclosure is not limited to the methods for implementing the downlink EDT indication information.

Step 2: if downlink EDT indication information associated with a UE in the paging message transmitted by the base station in Step 1 indicates that a downlink EDT is used for a current downlink transmission of the UE, the base station may recognize that the UE performs an EDT preparation operation in an RRC connection establishment procedure or an RRC connection resume procedure initiated in response to the paging message, and the base station may use an NCC stored in a UE access stratum context to derive a relevant security key and to activate security for transmitting an Msg4; and if downlink EDT indication information associated with a UE in the paging message transmitted by the base station in Step 1 indicates that a downlink EDT is not used for a current downlink transmission of the UE, the base station may recognize that the UE does not perform the EDT preparation operation in the RRC connection establishment procedure or the RRC connection resume procedure initiated in response to the paging message, and the base station may allocate a new NCC in the Msg4 for the UE, derive a relevant security key based on the NCC, and activate security for transmitting an Msg4.

Embodiment 10

Hereinafter, the embodiment 10 of the present invention will be described. The embodiment 10 provides a method for configuring downlink EDT indication information.

In this embodiment, if the base station confirms that a downlink EDT is used for a current downlink service of the UE, downlink EDT indication information associated with the UE in a paging message exists or is configured as TURE or 1; and if the base station confirms that the downlink EDT is not used for a current downlink service of the UE, the downlink EDT indication information associated with the UE in the paging message does not exist or is configured as FALSE or 0.

In this embodiment, the downlink EDT indication information (e.g., the following EDTindication-r16 information element) is included in a pagingrecord information element included in the paging message, and the pagingrecord information element includes a UE identity indicating that the paging message is associated with the UE corresponding to the UE identity.

```
PagingRecord-NB-r13 ::=SEQUENCE {
    ue-Identity-r13 PagingUE-Identity,
    EDTindication-r16           ENUMERATED {true}
    ...
}
```

Another implementation of the present embodiment is exemplified in the form of code as follows:

```
PagingRecord-NB-r13 ::=SEQUENCE {
    ue-Identity-r13 PagingUE-Identity,
    EDTindication-r16           BOOLEN
    ...
}
```

Embodiment 11

Hereinafter, the embodiment 11 of the present invention will be described. The embodiment 11 provides a method for configuring downlink EDT indication information.

In this embodiment, in addition to the existing UE identity list, a new UE identity list (such as pagingrecordlist-r16 information element) is introduced into the paging message, and the EDT is used for a downlink transmission, which is triggered by a current paging message, of the UE indicated by a UE identity of the new UE identity list. Specifically, if the base station determines that a downlink EDT is used for a current downlink service of a UE, the base station includes a UE identity of the UE in a new UE identity list included in a paging message; and if the base station determines that the downlink EDT is not used for a current downlink service of a UE, the base station does not include a UE identity of the UE in a new UE identity list (that is, the UE identity is included in the conventional pagingrecondlist) in a paging message.

In this embodiment, the downlink EDT indication information (e.g., the following pagingrecordlist-r16 information element) is a new paging UE identity list in the paging message.

```
Paging-NB ::=SEQUENCE {
    pagingRecordList-r13    PagingRecordList-NB-r13 OPTIONAL,
    pagingRecordList-r16    PagingRecordList-NB-r16 OPTIONAL,
}
```

Embodiment 12

Hereinafter, the embodiment 12 of the present invention will be described. The embodiment 12 provides a method for configuring downlink EDT indication information.

In this embodiment, in addition to the existing UE identity list, a downlink EDT indication information, which may be an integer represented by M bits, is introduced into the paging message, and a value of the downlink EDT indication information corresponds to a corresponding entry in the UE identity list. For example, if the value of the downlink EDT indication information is configured as N, it indicates that an EDT is adopted for a downlink transmission of UE(s) corresponding to the previous N (or the last N) UE identity entries in the UE identity list (i.e., pagingrecordlist).

If the base station determines that an EDT is adopted for a current downlink transmission of a UE, the base station may include the downlink EDT indication information, a value of which is configured as N, in the paging message, and include a UE identity corresponding to the UE in the previous N (or the last N) entries in the UE identity list included in the paging message. If the base station determines that an EDT is not adopted for a current downlink transmission of a UE, the base station may not include the downlink EDT indication information in the paging message or may not include the downlink EDT indication information including a value configured as N in the paging message, and may include a UE identity corresponding to the UE in the last N (or the previous N) entries in the UE identity list included in the paging message.

In this embodiment, the downlink EDT indication information (e.g., the following EDTindication-r16 information element) is an integer included in the paging message.

```
Paging-NB ::= SEQUENCE {
    pagingRecordList-r13         PagingRecordList-NB-r13 OPTIONAL,
    PagingRecordList-NB-r13 ::= SEQUENCE (SIZE (1..maxPageRec)) OF PagingRecord-NB-r13
```

-continued

```
    EDTindication-NB-r16 ::= interger(1...16)
}
```

Embodiment 13

Hereinafter, the embodiment 13 of the present invention will be described.

In the embodiment 9 described above, when the base station transmits a paging message, the base station needs to determine whether a downlink EDT is used for a current downlink transmission of a UE. Whether a downlink EDT is used as described above is determined mainly based on the size of service data, and optionally, the determination may also be made based on the size of service data together with enhanced coverage level information of the UE. The embodiment 13 provides a method executed on a base station for obtaining service data volume size information so as to assist the base station in confirming whether a downlink EDT is used for a downlink transmission.

Step 1: The base station receives a paging message for a UE from a network entity such as a mobility management entity (MME). The paging message may carry downlink service volume size information for a downlink transmission associated with the current paging. Optionally, the paging message may also carry enhanced coverage level information of the UE.

The downlink service volume size information may be a concrete value for a data packet size, such as X bits or X bytes, or may be an integer used for representing an approximate data size, such as 1 indicating a data size ranging from 1 bit to 200 bits, 2 indicating a data size ranging from 200 bits to 400 bits, and so on.

Further, the downlink service volume size information in the MME may be obtained by the MME from a gateway entity (such as a serving gateway), that is, the downlink service volume size information may be obtained from downlink service volume size information included in a downlink data notification message through the S11 interface.

Step 2: The base station determines whether an EDT is used for a downlink transmission of the UE, which corresponds to the current paging, based on the obtained downlink service volume size information and optionally based on the obtained enhanced coverage level information of the UE. Preferably, if a result of the determination is affirmative, the base station includes downlink EDT indication information in the paging message of the air interface, and if the result is negative, the base station does not include the downlink EDT indication information in the paging message of the air interface.

Embodiment 14

The present embodiment provides a method executed on a UE for indicating a downlink EDT. The difference from the above embodiment is that the downlink EDT indication information is included in downlink control information (DCI) and transmitted on a physical downlink control channel (PDCCH). In this embodiment, the UE does not obtain any information of whether a base station uses a downlink EDT for a mobile terminated downlink transmission before receiving the Msg4, so the UE may obtain the downlink EDT indication information through a PDCCH that is used for scheduling the Msg4.

Step 1: The UE receives PDCCH signaling that is used for scheduling a downlink transmission of the Msg4. Optionally, the PDCCH signaling includes downlink EDT indication information. As described above, the downlink EDT indication information is used for indicating that the Msg4 described in Step 2 includes downlink EDT data.

Before Step 1, the UE initiates the random access procedure and performs transmission for the first three messages of the random access procedure, including transmitting a random access preamble, receiving an RAR and transmitting the Msg3.

Step 2: The UE receives a physical downlink shared channel (PDSCH) transmission including the Msg4.

Step 3: If the UE determines that a current random access contention resolution is successful based on a contention resolution identity MAC control element included in the Msg4, and if the PDCCH information received in Step 1 includes the downlink EDT indication information, then the UE informs a higher layer of the downlink EDT indication information, wherein the higher layer may be at least an RRC layer, or alternatively may also be a MAC layer.

Step 4: When the RRC layer receives the downlink EDT indication information from the lower layer, the RRC layer may perform a downlink EDT preparation work and then perform L2 processing for the Msg4 received in Step 2 after finishing the preparation work. The downlink EDT preparation work has been described in the embodiment 1, and therefore, the description thereof is not repeated herein.

Embodiment 15

The present embodiment provides a method executed on a UE for aborting an EDT operation.

In this embodiment, when the UE receives from the lower layer an indication for cancelling a (uplink) EDT, if a fallback (i.e., EDT cancellation) indicated by the lower layer is in response to an RRC connection resume request for the (uplink) EDT and if the fallback is not made because an uplink grant provided in the RAR is not used for the EDT, and if the UE is not expected to receive a downlink EDT, then the UE may perform an abortion operation of a user plane EDT. The abortion operation can be referenced in Section 5.3.3.9a of the 3GPP protocol specification document TS36.311.

The UE is not expected to receive a downlink EDT. In one implementation, it can be expressed that the paging message received by the UE does not include a downlink EDT indication, or the UE does not receive the downlink EDT indication.

The program running on an equipment according to the present disclosure may be a program that enables a computer to implement the functions of the embodiments of the present disclosure by controlling a central processing unit (CPU). The program or information processed by the program may be temporarily stored in a volatile memory (e.g., random access memory (RAM)), a hard disk drive (HDD), a non-volatile memory (e.g., flash memory), or other memory systems.

The program for implementing the functions of each of the embodiments according to the present disclosure may be recorded on a computer-readable recording medium. The corresponding functions can be achieved by causing a computer system to read programs recorded on the recording medium and execute the programs. The so-called "computer system" herein may be a computer system embedded in the equipment, and may include an operating system or hardware (e.g., peripheral devices). The "computer-readable recording medium" may be a semiconductor recording medium, an optical recording medium, a magnetic recording medium, a recording medium for dynamically storing programs for a short time, or any other recording medium readable by a computer.

The various features or functional modules of the device used in the embodiments described above may be implemented or performed by circuitry (e.g., A monolithic or multi-chip integrated circuit). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, the present disclosure may also be implemented using these new integrated circuit technologies.

Furthermore, the present disclosure is not limited to the embodiments described above. Although various examples of the embodiments have been described, the present disclosure is not limited thereto. Fixed or non-mobile electronic equipment installed indoors or outdoors may be used as terminal equipment or communication equipment, such as AV equipment, kitchen equipment, cleaning equipment, air conditioners, office equipment, vending machines, and other household appliances.

As above, the embodiments of the present disclosure have been described in detail with reference to the accompanying drawings. However, the specific structure is not limited to the embodiments described above, and the present disclosure also includes any design changes without departing from the spirit of the present disclosure. In addition, various modifications can be made to the present disclosure within the scope of the claims, and embodiments obtained by appropriately combining the technical means disclosed in different embodiments are also included in the technical scope of the present disclosure. In addition, components having the same effect described in the above embodiments may be substituted for each other.

What is claimed is:

1. A method executed by a user equipment (UE), comprising:
   receiving a paging message from a base station;
   initiating a Radio Resource Control (RRC) connection establishment procedure or an RRC connection resume procedure based on the paging message; and
   when initiating the RRC connection establishment procedure or the RRC connection resume procedure, determining whether to perform a downlink early data transmission (EDT) preparation operation based on downlink EDT indication information included in the paging message and based on an establishment cause for initiating the RRC connection establishment procedure or the RRC connection resume procedure, wherein
   the downlink EDT indication information comprises a downlink EDT UE identity list included in the paging message; and
   when a UE identity of the UE is included in the downlink EDT UE identity list, the UE performs the downlink EDT preparation operation.

2. The method according to claim 1, wherein:
   the downlink EDT preparation operation is performed when the downlink EDT indication information is included in the paging message; and
   the downlink EDT preparation operation is not performed when the downlink EDT indication information is not included in the paging message.

3. The method according to claim 1, wherein the downlink EDT indication information comprises an integer represented by M bits and corresponding to an entry in the downlink EDT UE identity list included in the paging message.

4. The method according to claim 1, wherein the downlink EDT preparation operation comprises at least one of the following:
   restoring a Packet Data Convergence Protocol (PDCP) state corresponding to at least one of a Data Radio Bearer (DRB) and a Signal Radio Bearer (SRB);
   re-establishing a PDCP entity for the at least one of the DRB and the SRB;
   if a drb-continueROHC indication is provided in a most recent RRC connection release message and if the UE initiates the RRC connection establishment procedure or the RRC connection resume procedure within a same cell, then indicating to a lower layer that a stored UE access stratum context is used and drb-continueROHC is configured and continuing a header compression protocol context for the DRB configured with a header compression protocol;
   if the drb-continueROHC indication is not provided in the most recent RRC connection release message or if the UE initiates the RRC connection establishment procedure or the RRC connection resume procedure within a different cell, then indicating to the lower layer that the stored UE access stratum context is used and resetting the header compression protocol context for the DRB configured with the header compression protocol;
   resuming the at least one of the DRB and the SRB;
   using a stored Next Hop Chaining Counter (NCC) value and deriving a $K_{eNB}$ key based on a $K_{ASME}$ key associated with a current $K_{eNB}$ key;
   deriving a KRRCint key associated with a previously configured integrity algorithm;
   deriving a KRRCenc key and a KUPenc key associated with a previously configured encryption algorithm;
   configuring the lower layer to use the previously configured integrity algorithm and the derived KRRCint key to resume integrity protection for a subsequent message received and transmitted by the UE;
   configuring the lower layer to use the previously configured encryption algorithm and the derived KRRCenc key to resume encryption/decryption for the subsequent message received and transmitted by the UE;
   configuring the lower layer to use the previously configured encryption algorithm and the derived KUPenc key to immediately resume encryption/decryption for user data received or transmitted by the UE;
   resuming security; and
   configuring the lower layer to use EDT.

5. The method according to claim 1, wherein:
   determining whether to perform the downlink EDT preparation operation is further based on a value associated with the downlink EDT indication information;
   the downlink EDT preparation operation is performed when the value of the downlink EDT indication information is 1 or TRUE; and the downlink EDT preparation operation is not performed when the value of the downlink EDT indication information is 0 or not set to TRUE.

6. The method according to claim 1, wherein:
the downlink EDT preparation operation is performed when the establishment cause is a mobile terminated access, and the downlink EDT preparation operation is not performed when the establishment cause is not a mobile terminated access.

7. A user equipment (UE) comprising:
at least one processor; and
at least one memory coupled to the at least one processor and storing computer-executable instructions that, when executed by the at least one processor, cause the UE to perform operations comprising:
  receiving a paging message from a base station;
  initiating a Radio Resource Control (RRC) connection establishment procedure or an RRC connection resume procedure based on the paging message; and
  when initiating the RRC connection establishment procedure or the RRC connection resume procedure, determining whether to perform a downlink early data transmission (EDT) preparation operation based on downlink EDT indication information included in the paging message and based on an establishment cause for initiating the RRC connection establishment procedure or the RRC connection resume procedure, wherein
the downlink EDT indication information comprises a downlink EDT UE identity list included in the paging message; and
when a UE identity of the UE is included in the downlink EDT UE identity list, the UE performs the downlink EDT preparation operation.

8. The UE according to claim 7, wherein:
the downlink EDT preparation operation is performed when the downlink EDT indication information is included in the paging message; and
the downlink EDT preparation operation is not performed when the downlink EDT indication information is not included in the paging message.

9. The UE according to claim 7, wherein the downlink EDT indication information comprises an integer represented by M bits and corresponding to an entry in the downlink EDT UE identity list included in the paging message.

10. The UE according to claim 7, wherein the downlink EDT preparation operation comprises at least one of the following:
  restoring a Packet Data Convergence Protocol (PDCP) state corresponding to at least one of a Data Radio Bearer (DRB) and a Signal Radio Bearer (SRB);
  re-establishing a PDCP entity for the at least one of the DRB and the SRB;
  if a drb-continueROHC indication is provided in a most recent RRC connection release message and if the UE initiates the RRC connection establishment procedure or the RRC connection resume procedure within a same cell, then indicating to a lower layer that a stored UE access stratum context is used and drb-continueROHC is configured and continuing a header compression protocol context for the DRB configured with a header compression protocol;
  if the drb-continueROHC indication is not provided in the most recent RRC connection release message or if the UE initiates the RRC connection establishment procedure or the RRC connection resume procedure within a different cell, then indicating to the lower layer that the stored UE access stratum context is used and resetting the header compression protocol context for the DRB configured with the header compression protocol;
  resuming the at least one of the DRB and the SRB;
  using a stored Next Hop Chaining Counter (NCC) value and deriving a $K_{eNB}$ key based on a $K_{ASME}$ key associated with a current $K_{eNB}$ key;
  deriving a KRRCint key associated with a previously configured integrity algorithm;
  deriving a KRRCenc key and a KUPenc key associated with a previously configured encryption algorithm;
  configuring the lower layer to use the previously configured integrity algorithm and the derived KRRCint key to resume integrity protection for a subsequent message received and transmitted by the UE;
  configuring the lower layer to use the previously configured encryption algorithm and the derived KRRCenc key to resume encryption/decryption for the subsequent message received and transmitted by the UE;
  configuring the lower layer to use the previously configured encryption algorithm and the derived KUPenc key to immediately resume encryption/decryption for user data received or transmitted by the UE;
  resuming security; and
  configuring the lower layer to perform EDT.

11. The UE according to claim 7, wherein:
determining whether to perform the downlink EDT preparation operation is further based on a value associated with the downlink EDT indication information;
the downlink EDT preparation operation is performed when the value of the downlink EDT indication information is 1 or TRUE; and
the downlink EDT preparation operation is not performed when the value of the downlink EDT indication information is 0 or not set to TRUE.

12. The UE according to claim 7, wherein:
the downlink EDT preparation operation is performed when the establishment cause is a mobile terminated access, and
the downlink EDT preparation operation is not performed when the establishment cause is not a mobile terminated access.

13. A base station comprising:
at least one processor; and
at least one memory coupled to the at least one processor and storing configured to store computer-executable instructions that, when executed by the at least one processor, cause the base station to perform operations comprising:
  receiving a paging message for a user equipment (UE) from a mobility management entity (MME), the paging message including first downlink data volume size information for a downlink transmission associated with current paging;
  determining whether a downlink data transmission is performed by adopting a downlink early data transmission (EDT) according to the first downlink data volume size information;
  transmitting the paging message to the UE; and
  indicating to the UE via downlink EDT indication information whether to perform a downlink EDT preparation operation when a Radio Resource Control (RRC) connection establishment procedure or an RRC connection resume procedure is initiated by the UE based on the paging message.

14. The base station according to claim 13, wherein the MME is configured to:
  receive a downlink data notification message from a serving gateway, the downlink data notification message including second downlink data volume size information; and
  transmit the paging message for the UE to the base station, wherein:
    the paging message includes the first downlink data volume size information for the downlink transmission associated with the current paging; and
    the first downlink data volume size information is determined based on the second downlink data volume size information.

* * * * *

UNITED STATES PATENT AND TRADEMARK OFFICE
CERTIFICATE OF CORRECTION

| | |
|---|---|
| PATENT NO. | : 11,653,328 B2 |
| APPLICATION NO. | : 17/278821 |
| DATED | : May 16, 2023 |
| INVENTOR(S) | : Ningjuan Chang, Chao Luo and Renmao Liu |

It is certified that error appears in the above-identified patent and that said Letters Patent is hereby corrected as shown below:

On the Title Page

Please replace item (54) and in the Specification Column 1, Lines 1-5 with the following:
(54) USER EQUIPMENT AND METHOD EXECUTED THEREBY, BASE STATION AND METHOD EXECUTED THEREBY, AND MOBILE CONTROL ENTITY AND METHOD EXECUTED THEREBY Signed and Sealed this
Twenty-third Day of January, 2024

Katherine Kelly Vidal
*Director of the United States Patent and Trademark Office*